United States Patent
Mitsui et al.

(10) Patent No.: US 11,742,170 B2
(45) Date of Patent: Aug. 29, 2023

(54) FUSE PULLER ACCOMMODATING STRUCTURE AND AN ELECTRICAL JUNCTION BOX

(71) Applicant: Yazaki Corporation, Tokyo (JP)

(72) Inventors: Takahiko Mitsui, Makinohara (JP); Yosuke Ogawa, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 348 days.

(21) Appl. No.: 17/331,834

(22) Filed: May 27, 2021

(65) Prior Publication Data
US 2021/0407756 A1 Dec. 30, 2021

(30) Foreign Application Priority Data
Jun. 26, 2020 (JP) .................. 2020-110094

(51) Int. Cl.
*H01H 85/00* (2006.01)
*H01H 85/02* (2006.01)
*H02B 1/46* (2006.01)

(52) U.S. Cl.
CPC ........... *H01H 85/0208* (2013.01); *H02B 1/46* (2013.01)

(58) Field of Classification Search
CPC .............................. H01H 85/0208; H02B 1/46
See application file for complete search history.

(56) References Cited

U.S. PATENT DOCUMENTS

| 5,751,208 | A | * | 5/1998 | Martinez | ............ | H01H 85/0208 |
| | | | | | | 337/194 |
| 2015/0228434 | A1 | * | 8/2015 | Kubota | .............. | H01H 85/2035 |
| | | | | | | 439/830 |
| 2017/0365437 | A1 | * | 12/2017 | Brakefield | ........... | H01H 71/122 |

FOREIGN PATENT DOCUMENTS

| JP | 61-166455 U | 10/1986 |
| JP | 06-11248 U | 2/1994 |
| JP | 08-315714 A | 11/1996 |

* cited by examiner

*Primary Examiner* — Pete T Lee
(74) *Attorney, Agent, or Firm* — Sughrue Mion, PLLC

(57) ABSTRACT

A fuse puller accommodating structure includes a puller main body, a puller accommodating section, an accommodating side protrusion provided within the puller accommodating section, a puller side protrusion provided on the puller main body, wherein the puller side protrusion is configured to be locked to the accommodating side protrusion, and a pushing-up section provided at a bottom of the puller accommodating section, wherein the pushing-up section is configured to bias a forward end of the puller main body accommodated in the puller accommodating section in a pushing-up direction in order to push the puller side protrusion against the accommodating side protrusion, wherein the forward end is oriented forward with respect to an inserting direction, and wherein the pushing-up direction is opposite to the inserting direction.

16 Claims, 6 Drawing Sheets

FUSE PULLER ACCOMMODATING STRUCTURE AND AN ELECTRICAL JUNCTION BOX

BACKGROUND OF THE INVENTION

Technical Field

The present invention relates to a fuse puller accommodating structure in which a fuse puller as a tool for detaching/attaching a fuse is accommodated, and to an electrical junction box including such a fuse puller accommodating structure.

Background Art

Conventionally, a fuse puller is known as a tool for detaching/attaching a fuse to a mounting position e.g. for maintenance. Further, among electrical junction boxes with such a position for mounting the fuse thereto, such electrical junction boxes are known which have a fuse puller accommodating structure, wherein the fuse puller accommodating structure accommodates a fuse puller so as to be always available there (see e.g. Patent Document 1).

In a fuse puller accommodating structure according to Patent Document 1, a fuse puller includes a puller main body configured to clamp and hold a fuse when detaching or attaching the fuse, wherein the puller main body is provided with a puller side protrusion for locking, and a puller accommodating section is provided with an accommodating side protrusion. In a non-used state of the fuse puller, the puller main body is accommodated in the puller accommodating section, with the puller side protrusion being locked to the accommodating side protrusion. Then, when performing e.g. maintenance, the puller main body and thus the fuse puller are brought out of the puller accommodating section by an operator in order to detaching or attaching the fuse.

CITATION LIST

Patent Literature

Patent Document 1: JP 118-315714

SUMMARY OF THE INVENTION

Here, for a fuse puller accommodating structure in which the puller main body is accommodated into the puller accommodating section with the puller side protrusion being locked to the accommodating side protrusion, a gap is caused between the puller side protrusion and the accommodating side protrusion in an accommodated state. Then, this gap may cause instability between the puller main body and the puller accommodating section so that an abnormal noise may be generated.

Therefore, the present invention is focused on such a problem, and an objective of the present invention is to provide a fuse puller accommodating structure which enables the generation of abnormal noises to be suppressed, and to provide an electrical junction box with such a fuse puller accommodating structure.

In order to achieve the objective as described above, a fuse puller accommodating structure includes a puller main body configured to hold a fuse when detaching or attaching the fuse, a bottomed-tubular puller accommodating section configured for inserting and accommodating the puller main body in a non-used state therein, an accommodating side protrusion provided within the puller accommodating section, a puller side protrusion provided on the puller main body, wherein the puller side protrusion is configured to cross over the accommodating side protrusion in an inserting direction of the puller main body and be then locked to the accommodating side protrusion when inserting the puller main body into the puller accommodating section, and a pushing-up section provided at a bottom of the puller accommodating section, wherein the pushing-up section is configured to bias a forward end of the puller main body accommodated in the puller accommodating section in a pushing-up direction in order to push the puller side protrusion against the accommodating side protrusion, wherein the forward end is oriented forward with respect to the inserting direction, and wherein the pushing-up direction is opposite to the inserting direction.

Further, in order to achieve the objective as described above, an electrical junction box includes the fuse puller accommodating structure as described above, and a box main body section, wherein the box main body section is configured so that the fuse is attached to or detached from the box main body section by means of the puller main body.

With the fuse puller accommodating structure and electrical junction box as described above, when the puller main body is inserted into the puller accommodating section, the puller side protrusion crosses over and is locked to the accommodating side protrusion, wherein the puller side protrusion is then pushed against the accommodating side protrusion by biasing the forward end of the puller main body with the pushing-up section. Such pushing eliminates a gap between the puller side protrusion and the accommodating side protrusion when accommodating, so that instability is eliminated which is caused between the puller main body and the puller accommodating section due to the gap. Thus, the elimination of the instability can suppress the generation of abnormal noises.

DETAILED DESCRIPTION OF THE PREFERRED EMBODIMENTS

Hereinafter, embodiments for a fuse puller accommodating structure and an electrical junction box with such a fuse puller accommodating structure will be described.

Figure 1:
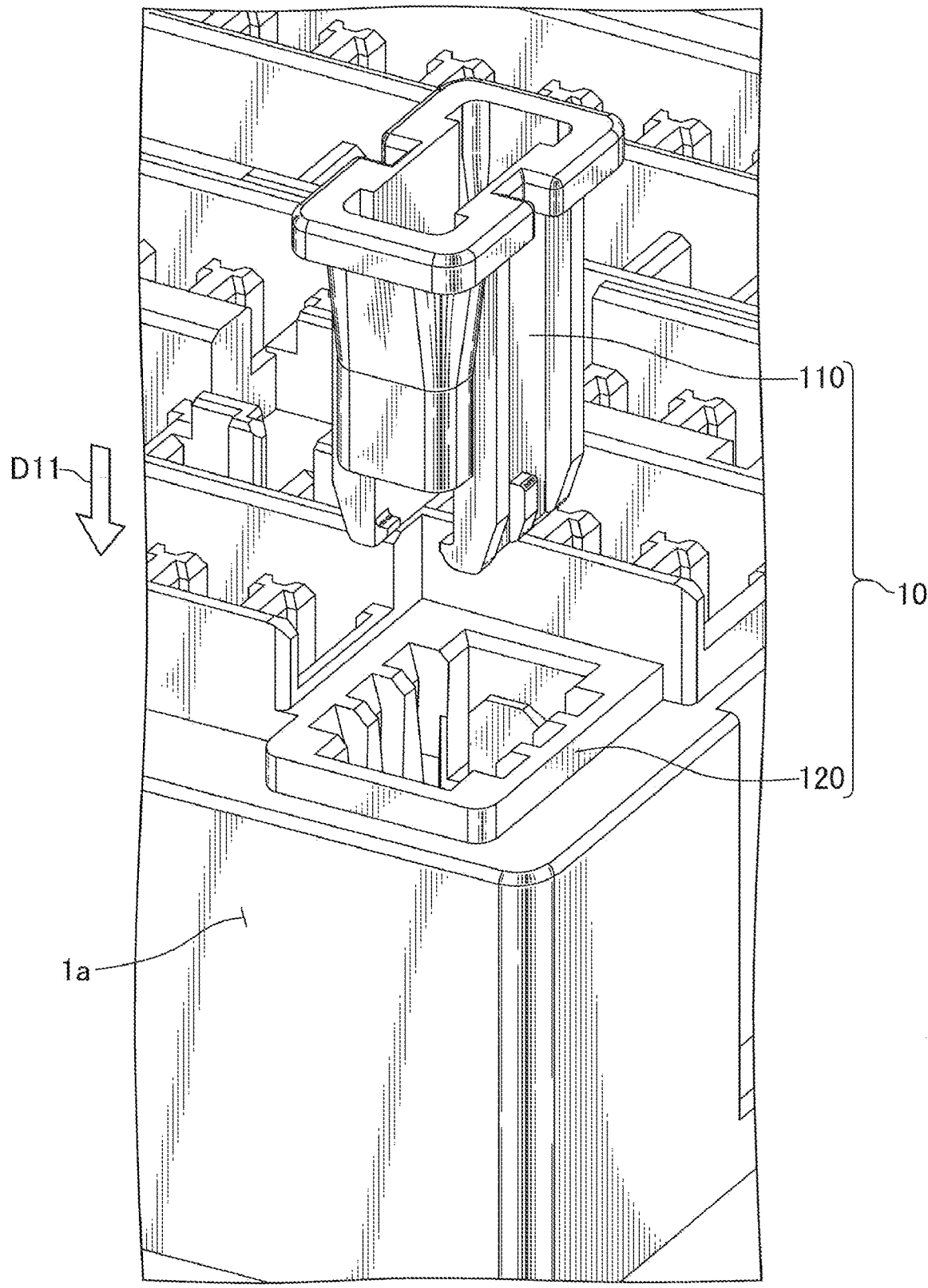
FIG. 1 is an exterior perspective view of an electrical junction box with a fuse puller accommodating structure according to an embodiment.

FIG. 1 shows an exterior perspective view of an electrical junction box with a fuse puller accommodating structure according to an embodiment.

The electrical junction box 1 according to the present embodiment is configured so that a fuse is attachable to and detachable from a box main body section 1a by means of a fuse puller 110 as a tool for attaching/detaching e.g. for maintenance, wherein the fuse is not shown. Further, a fuse puller accommodating structure 10 is provided at a corner of the box main body section 1a, wherein the fuse puller accommodating structure 10 includes a fuse puller 110 and an accommodating member 120 for it. The accommodating member 120 is fixed to the electrical junction box 1, and the fuse puller 110 is provided in the electrical junction box 1 so as to be always available, being inserted and accommodated into the accommodating member 120 in an inserting direction D11. For maintenance or the like, the fuse puller 110 is brought out of the accommodating member 120 of the electrical junction box 1 by an operator in order to detach or attach the fuse.

Figure 2:
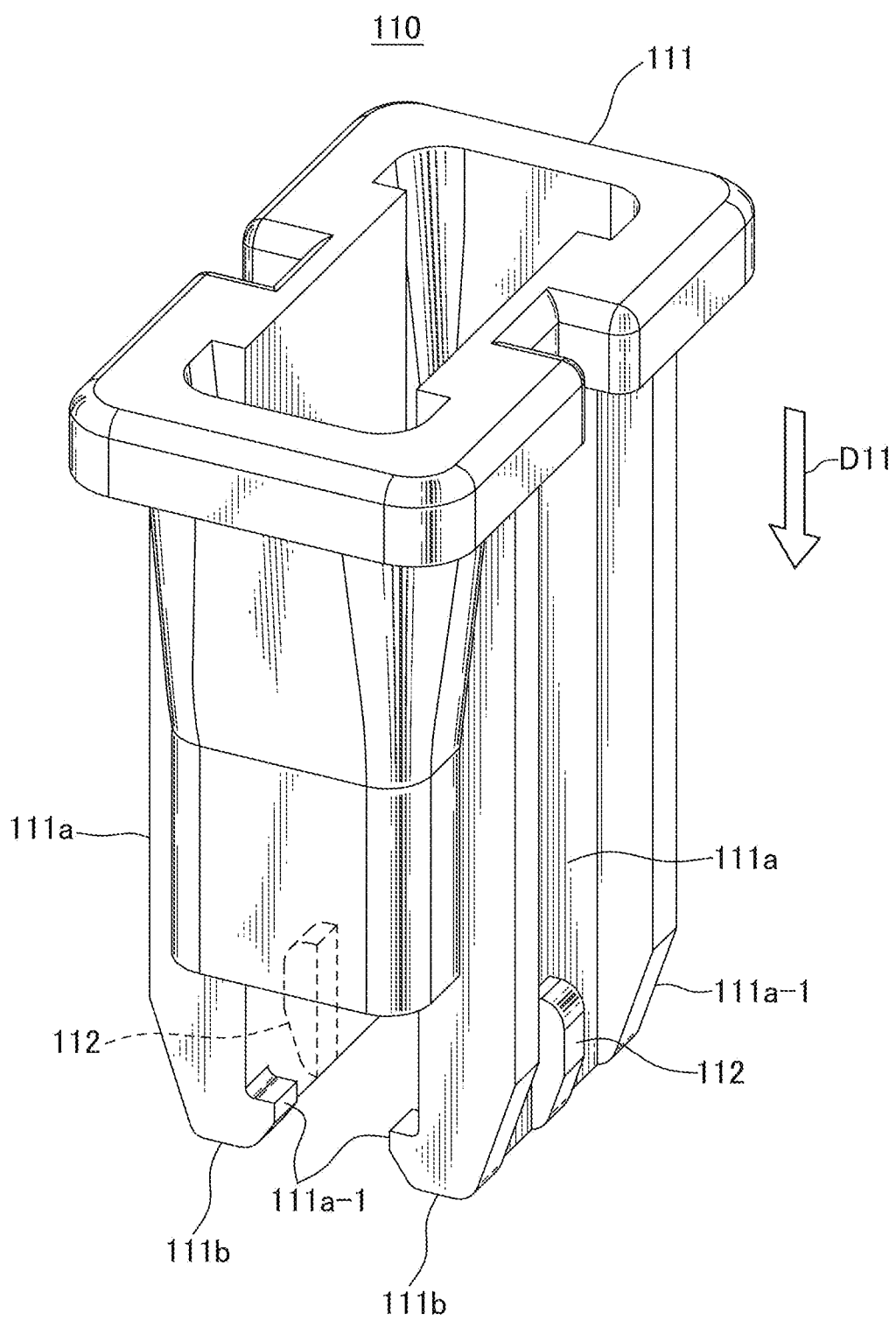
FIG. 2 is an enlarged perspective view of a fuse puller according to FIG. 1.
Figure 3:
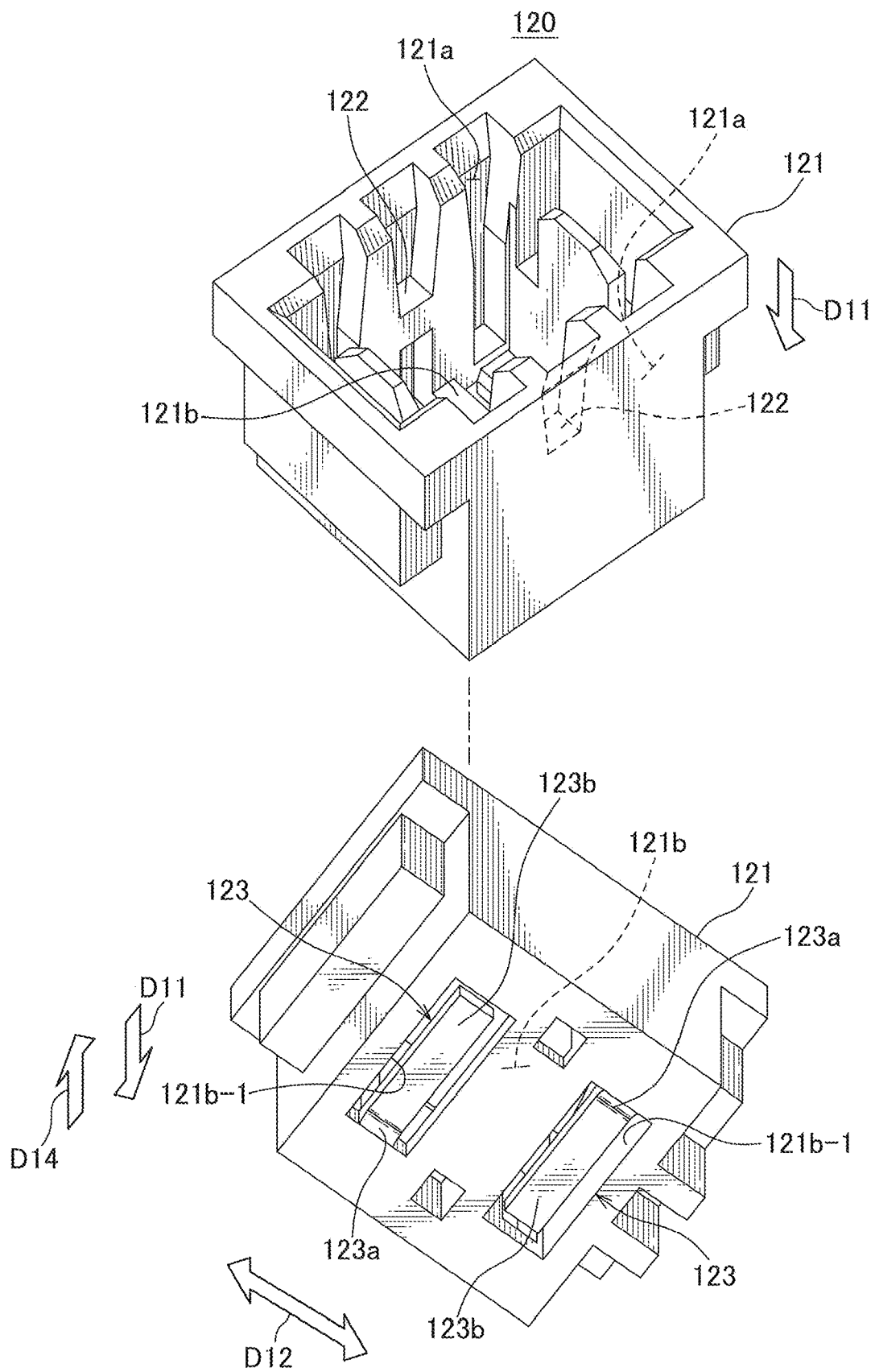
FIG. 3 is an enlarged perspective view of an accommodating member according to FIG. 1 brought out of the electrical junction box, wherein the accommodating member is viewed from two directions.
Figure 4:
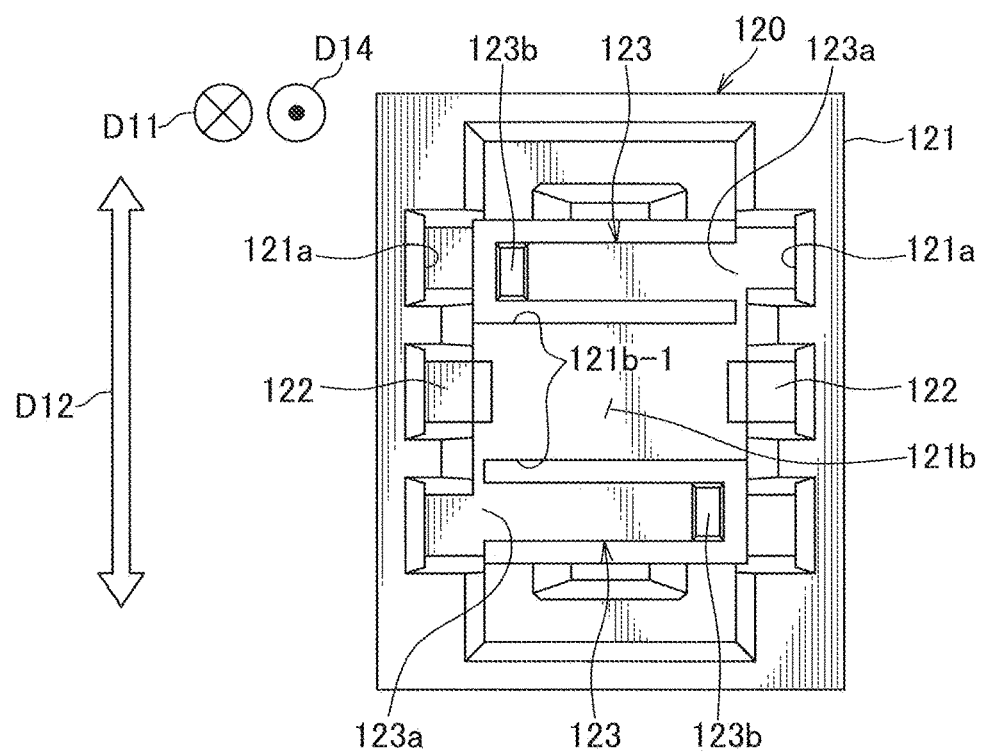
FIG. 4 is a plan view of the accommodating member according to FIG. 3 as viewed from an inserting direction of the fuse puller.

FIG. 2 shows an enlarged perspective view of the fuse puller according to FIG. 1, wherein FIG. 3 shows an enlarged perspective view of an accommodating member according to FIG. 1 brought out of the electrical junction box, wherein the accommodating member is viewed from two directions. FIG. 4 shows a plan view of the accommodating member according to FIG. 3 as viewed from an inserting direction of the fuse puller.

The fuse puller 110 is a tool which is made of resin and configured to attach/detach the fuse. The fuse puller 110 includes a puller main body 111 and puller side protrusions 112.

The puller main body 111 is a member which has a rectangular tube shape and holds the fuse when detaching or attaching the fuse, wherein a pair of opposed side walls of surrounding walls of the puller main body 111 extends outside in the inserting direction D11 to form a pair of opposed gripping elements 111a, the pair of gripping elements 111a being configured to hold the fuse by clamping it. The puller main body 111 includes gripping claws 111a-1 on a side facing a forward end 111b of the puller main body 111 in the inserting direction D11, wherein the gripping claws 111a-1 are configured to be locked to the fuse. Here, two gripping claws 111a-1 are provided for each of the gripping elements 111a, i.e. totally four gripping claws 111a-1.

The puller side protrusions 112 are portions which are locked to accommodating side protrusions 122 of the accommodating member 120 when the puller main body 111 and thus the fuse puller 110 are accommodated into the accommodating member 120. The fuse puller 110 is held by the accommodating member 120 by locking the puller side protrusion 112 to the accommodating side protrusions 122. According to the present embodiment, the puller side protrusions 112 are configured in the form of protrusion which each are arranged on an outer lateral surface of one of the pair of opposed gripping elements 111a. Each of the puller side protrusions 112 is arranged so as to be positioned at a center on a side of the outer lateral surface of one gripping element 111a in a width direction, wherein the side of the outer lateral surface is facing the forward end 111b.

The accommodating member 120 is a member which is made of resin and configured to be attached to the box main body section 1a for the purpose of arranging the fuse puller 110 in the electrical junction box 1 so as to be always available. The accommodating member 120 includes a puller accommodating section 121, the accommodating side protrusions 122 and pushing-up sections 123.

The puller accommodating section 121 is a portion which has a bottomed tube shape (more particularly a rectangular bottomed tube shape) and is configured for inserting and accommodating the puller main body 111 in a non-used state therein. The puller accommodating section 121 includes a pair of opposed inner wall surfaces 121a which face outer lateral surfaces of the pair of opposed gripping elements 111a when the puller accommodating section 121 accommodates the puller main body 111, wherein each of the inner wall surfaces 121a includes an accommodating side protrusion 122 to which a puller side protrusion 112 is locked.

The accommodating side protrusions 122 are provided within the puller accommodating section 121 and configured as portions to which the puller side protrusions 112 are locked when accommodating the puller main body 111. According to the present embodiment, one accommodating side protrusion 122 is arranged at a portion of each of the pair of opposed inner wall surfaces 121a of the puller accommodating section 121, wherein the portion is a center of the puller main body 111 in the inserting direction D11 and in the width direction.

The pushing-up sections 123 are portions which are provided in a bottom 121b of the puller accommodating section 121 and configured to bias the forward end 111b of the puller main body 111 accommodated in the puller accommodating section 121 in a pushing-up direction D14, wherein the forward end 111b is oriented forward in the inserting direction D11, and wherein the pushing-up direction D14 is opposite to the inserting direction D11. These pushing-up sections 123 are configured as cantilevers which each have one end as a fixed end 123a and the other end as a free end 123b. Further, the cantilevers as the pushing-up sections 123 are portions which are cut out from the bottom 121b of the puller accommodating section 121 by forming C-shaped slits 121b-1 therein. Further, according to the present embodiment, a pair of cantilevers is provided as the pushing-up sections 123 so as to extend in parallel to each other in a staggered manner, in which a fixed end 123a of one of the cantilevers is positioned closer to a free end 123b of the other of the cantilevers.

Figure 5:
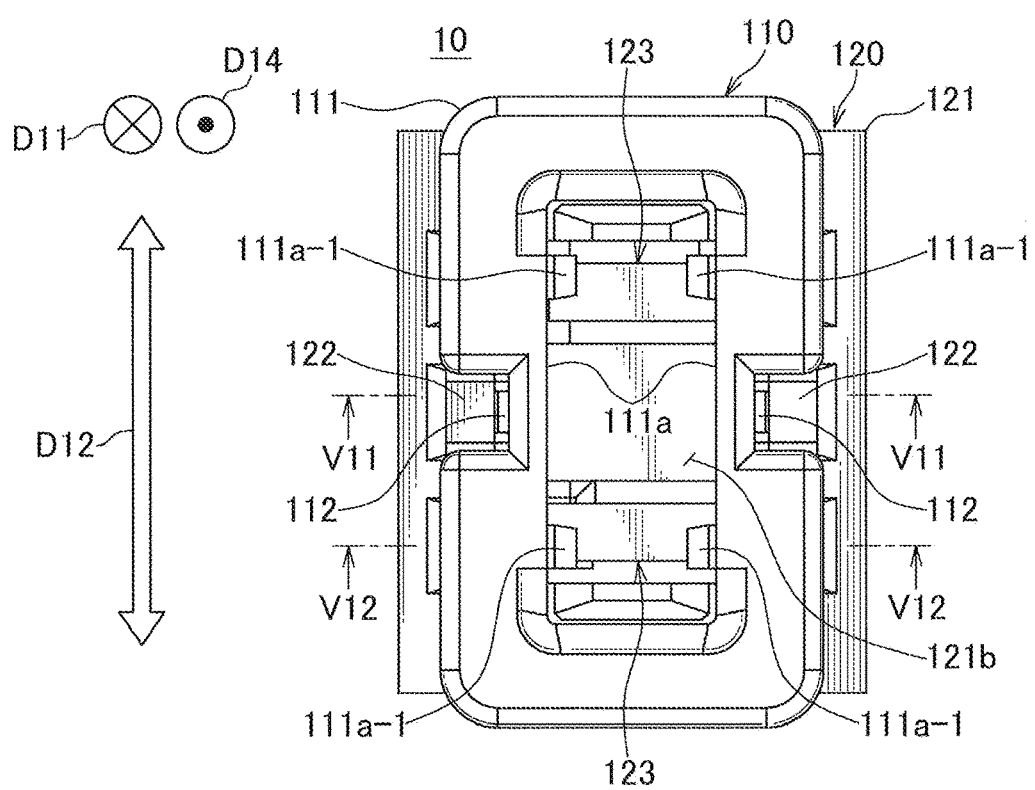
FIG. 5 is a plan view of the fuse puller accommodating structure as viewed from the inserting direction of the fuse puller, wherein the fuse puller is inserted into and held by the accommodating member.
Figure 6:
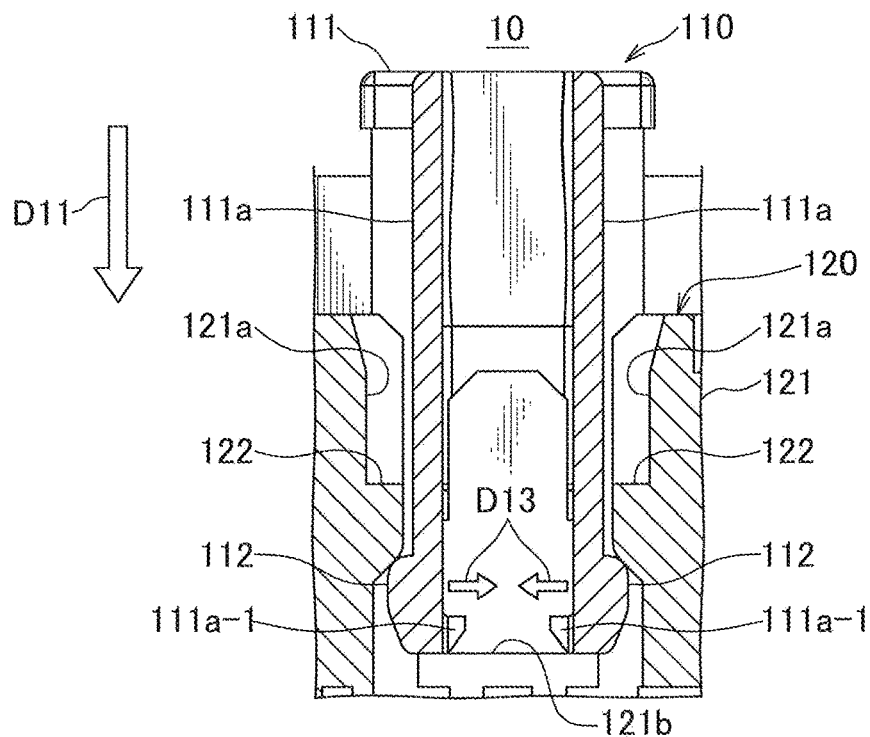
FIG. 6 is a sectional view of the fuse puller accommodating structure along the line V11-V11 in FIG. 5.
Figure 7:
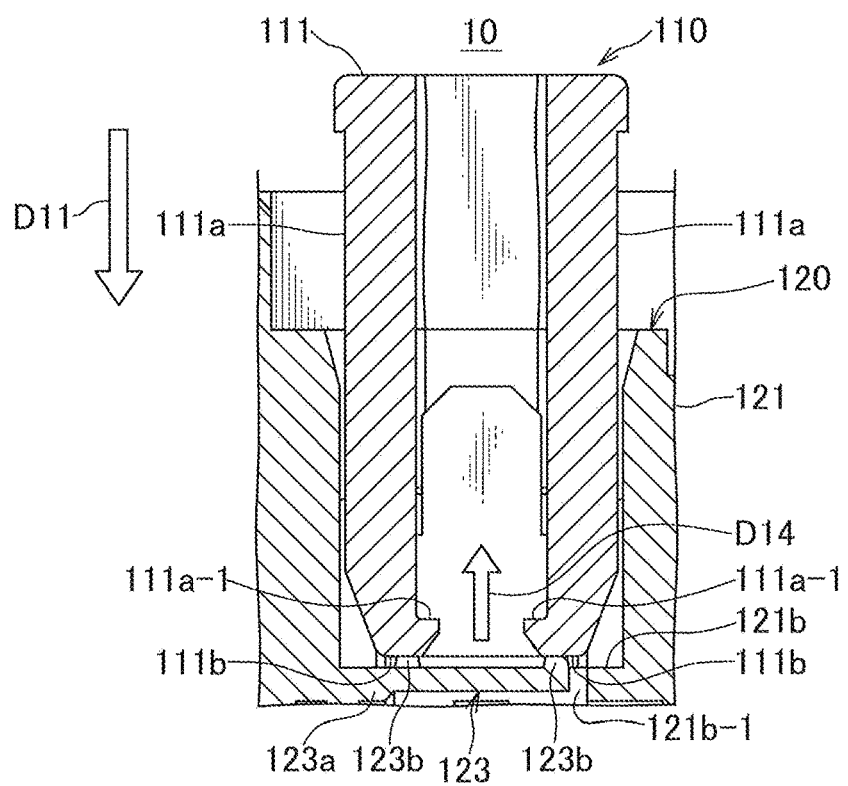
FIG. 7 is a sectional view of the fuse puller accommodating structure along the line V12-V12 in FIG. 5.

FIG. 5 shows a plan view of the fuse puller accommodating structure as viewed from the inserting direction of the fuse puller, wherein the fuse puller is inserted into and held by the accommodating member. Further, FIG. 6 shows a sectional view of the fuse puller accommodating structure along the line V11-V11 in FIG. 5, and FIG. 7 shows a sectional view of the fuse puller accommodating structure along the line V12-V12 in FIG. 5.

First, when the fuse puller 110 is inserted into the accommodating member 120, i.e. the puller main body 111 is inserted into the puller accommodating section 121, the puller side protrusions 112 cross over the accommodating side protrusions 122 in the inserting direction D11 of the puller main body 111 to be locked to them as follows: the puller side protrusions 112 interfere with the accommodating side protrusions 122 to bend the pair of opposed gripping elements 111a of the puller main body 111 in a bending direction D13 (FIG. 6), wherein in the bending direction D13, the pair of gripping elements 111a approaches each other. Then, bending the gripping elements 111a in this manner causes the puller side protrusions 112 to cross over the accommodating side protrusions 122, wherein after the puller side protrusions 112 have crossed over the accommodating side protrusions 122 completely, the gripping elements 111a are returned so that the puller side protrusions 112 are locked to the accommodating side protrusions 122.

Further at this time, the pushing-up sections 123 in the bottom 121b of the puller accommodating section 121 bias the forward end 111b of the puller main body 111 in the pushing-up direction D14 (FIG. 7), the forward end 111b including the gripping claws 111a-1. The free ends 123b of the pushing-up sections 123 as the cantilevers as described above are formed in a protruding shape in which they protrude inwardly in the puller accommodating section 121. In this manner, when the puller main body 111 is inserted into the puller accommodating section 121, the pushing-up sections 123 are bent in the inserting direction D11 so that the free ends 123b are pushed down by an amount of the protrusion. Then, the pushing-up sections 123 bias the forward end 111b of the puller main body 111 in the pushing-up direction D14 with the free ends 123b via a restoring force of the bending. As a result of this biasing in the pushing-up direction D14, the puller side protrusions 112 are pushed against the accommodating side protrusions 122 in the pushing-up direction D14.

Furthermore, according to the present embodiment, a pair of cantilevers is provided as the pushing-up sections 123 so as to extend in parallel to each other in a staggered manner, as shown in FIG. 4. Then, the free end 123b of one of the pushing-up sections 123 pushes up the forward end 111b of the puller main body 111 at one of the pair of opposed gripping elements 111a, wherein the free end 123b of the other of the pushing-up sections 123 pushes up the forward end 111b at the other of the gripping elements 111a.

According to the present embodiment, a pair of pushing-up sections 123 is arranged in an arranging direction D12 in the bottom 121b of the puller accommodating section 121, wherein the arranging direction D12 extends along the bottom, intersects the inserting direction D11, and coincides with a width direction of the inner wall surfaces 121a and/or the gripping elements 111a of the puller main body 111. Then, the accommodating side protrusions 122 and the puller side protrusions 112 are configured to be positioned between the pair of pushing-up sections 123 with respect to the arranging direction D12 in a state where the protrusions 122 and 112 are locked to each other.

The fuse puller accommodating structure 10 and electrical junction box 1 according to the above-described embodiment can achieve effects as described below. Before explaining these effects, a reference example for comparison with the fuse puller accommodating structure 10 according to the above-described embodiment will be described hereinafter.

Figure 8:
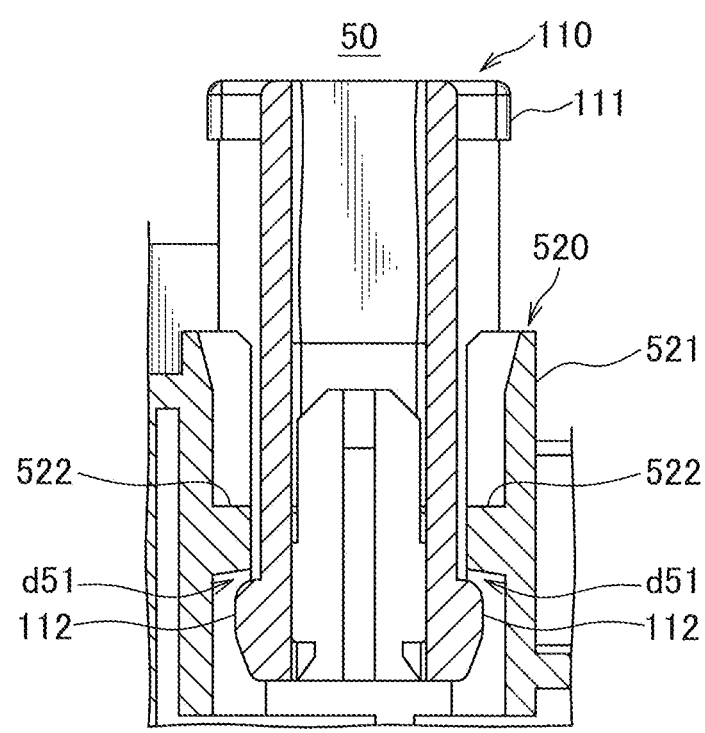
FIG. 8 shows a fuse puller accommodating structure according to a reference example for comparison with the fuse puller accommodating structure according to the embodiment in FIGS. 1 to 7, in a similar sectional view to FIG. 6.

FIG. 8 shows a fuse puller accommodating structure according to a reference example for comparison with the fuse puller accommodating structure according to the embodiment in FIGS. 1 to 7, in a similar sectional view to FIG. 6. It is to be noted that elements in FIG. 8 which are similar to those in FIG. 6 are designated with the same reference signs as those used in FIG. 6, wherein repeating the description of these similar elements shall be omitted in the following description.

The fuse puller accommodating structure 50 according to the reference example shown in this FIG. 8 does not include a feature corresponding to the pushing-up section 123 according to FIG. 6, in the puller accommodating section 521 of the accommodating member 520, wherein the accommodating section 521 is configured to accommodate a puller main body 111 of a fuse puller 110 therein. Therefore, when the puller main body 111 is accommodated into the puller accommodating section 521, and the puller side protrusions 112 cross over the accommodating side protrusions 522 and are locked to them, a gap d51 is formed between the accommodating side protrusions 522 and the puller side protrusions 112 since there is no pushing of the puller side protrusions 112 against the accommodating side protrusions 522. In the fuse puller accommodating structure 50 according to the reference example, the gap d51 may cause instability between the puller main body 111 and the puller accommodating section 521, whereby an abnormal noise may be generated.

In contrary to the fuse puller accommodating structure 50 according to the reference example as described above, the fuse puller accommodating structure 10 according to the above-described embodiment and the electrical junction box 1 including the fuse puller accommodating structure 10 can suppress generation of abnormal noises as described below.

With the present embodiment, when the puller main body 111 is inserted into the puller accommodating section 121, the puller side protrusions 112 cross over and are locked to the accommodating side protrusions 122, wherein the puller side protrusions 112 are then pushed against the accommodating side protrusions 122 by biasing the forward end 111b of the puller main body 111 with the pushing-up sections 123. Such pushing eliminates a gap between the puller side protrusions 112 and the accommodating side protrusions 122 when accommodating, so that instability is eliminated which is caused between the puller main body 111 and the puller accommodating section 121 due to the gap. Thus, the elimination of the instability can suppress the generation of abnormal noises.

Then, according to the present embodiment, a pair of puller side protrusions 112 each provided on the outer lateral surface of one of the gripping elements 111a of the puller main body 111 cross over a pair of accommodating side protrusions 122 to be locked to the pair of accommodating side protrusions 122 while bending the respective gripping elements 111a so that the pair of puller side protrusions 112 are locked to the pair of accommodating side protrusions 122, the accommodating side protrusions 122 being provided on the inner wall surfaces 121a of the puller accommodating section 121. This configuration is preferable since the puller main body 111 can be firmly held by the puller accommodating section 121 by locking the pair of puller side protrusions 112 of the puller main body 111 to the pair of accommodating side protrusions 122 of the puller accommodating section 121.

Further, the present embodiment is provided so that the pushing-up sections 123 are cantilevers, wherein when accommodating the puller main body 111, the cantilevers are configured to be bent so that they bias the forward end 111b of the puller main body 111 with the free ends 123b of the cantilevers in the pushing-up direction D14 via the restoring force. With this configuration, the puller main body 111 being accommodated is pushed up by the pushing-up sections 123 in the form of cantilevers which are configured in a leaf-spring shape and exert a high biasing force. With such pushing up, the puller side protrusions 112 are firmly pushed against the accommodating side protrusions 122 so that abnormal noises can be further suppressed.

Furthermore, according to the present embodiment, the cantilevers as the pushing-up sections 123 are portions which are cut out from the bottom 121b of the puller accommodating section 121 by forming C-shaped slits 121b-1 therein. With this configuration, a portion of the bottom 121b of the puller accommodating section 121 is utilized for the cantilevers as the pushing-up sections 123 so that the number of components can be reduced.

Furthermore, according to the present embodiment, a pair of cantilevers is provided as the pushing-up sections 123 so as to extend in parallel to each other in a staggered manner, in which a fixed end 123a of one of the cantilevers is positioned closer to a free end 123b of the other of the cantilevers. With this configuration, the forward end 111b of the puller main body 111 being accommodated is pushed up by the pair of cantilevers which are arranged in a staggered manner. With such pushing up, it is possible to push the puller side protrusions 112 against the accommodating side protrusions 122 firmly and in a well-balanced manner, so that abnormal noises can be further suppressed.

Moreover, according to the present embodiment, the accommodating side protrusions 122 and the puller side protrusions 112 are configured to be positioned between the pair of pushing-up sections 123 with respect to the arranging direction D12 of the pushing-up sections 123 in a state where the protrusions 122 and 112 are locked to each other. Also in this point of view, the present embodiment can enable the puller side protrusions 112 to be pushed against the accommodating side protrusions 122 firmly and in a well balanced manner, so that abnormal noises can be further suppressed.

It is to be noted that the embodiments as described above merely show representative embodiments for the fuse puller accommodating structure and electrical junction box, wherein the fuse puller accommodating structure and electrical junction box is not limited thereto, but numerous variations thereof may be implemented.

For example, the above-described embodiment shows the puller main body 111 and the puller accommodating section 121 as examples for the puller main body and the puller accommodating section, respectively, each of the puller main body 111 and the puller accommodating section 121 being made of resin and having a rectangular tube shape. However, the puller main body and the puller accommodating section are not limited thereto, but any specific appropriate shape and/or material characteristics may be selected for each of these elements.

Further, as an example for the puller accommodating section, the above-described embodiment shows the puller accommodating section 121 which forms a part of the accommodating member 120 as a separate component from the box main body section 1a of the electrical junction box 1. However, the puller accommodating section is not limited thereto, but may be configured e.g. as a part of the box main body section of the electrical junction box in an integral manner.

Further, as examples for the puller side protrusions and accommodating side protrusions, the above-described embodiment shows a pair of puller side protrusions 112 and a pair of accommodating side protrusions 122, wherein the pair of puller side protrusions 112 is provided on the gripping elements 111a of the puller main body 111, and the pair of accommodating side protrusions 122 is provided on the inner wall surfaces 121a of the puller accommodating section 121. However, the puller side protrusion and accommodating side protrusion are not limited thereto, but any position for forming protrusions and any number of protrusions may be selected which are formed on each of the puller main body and the puller accommodating section. However, as described above, the puller main body 111 may be held firmly by the puller accommodating section 121 by providing a pair of puller side protrusions 112 and a pair of accommodating side protrusions 122 on the gripping elements 111a of the puller main body 111 and on the inner wall surfaces 121a of the puller accommodating section 121 respectively.

Furthermore, as an example for the pushing-up section, the above-described embodiment shows the pushing-up sections 123 which are configured as cantilevers. However, the pushing-up section is not limited thereto, but any element may be selected which enables the forward end of the puller main body to be biased with the puller main body being accommodated in the puller accommodating section, e.g. a coil spring and/or an elastic rubber. However, as described above, the puller side protrusions 112 can be pushed against the accommodating side protrusions 122 firmly by utilizing cantilevers as the pushing-up sections 123, so that abnormal noises can be further suppressed.

Moreover, as an example for the pushing-up section, the above-described embodiment shows the pushing-up sections 123 which are cut out in the form of cantilevers from the bottom 121b of the puller accommodating section 121 by forming the C-shaped slits 121b-1 therein. However, even when the pushing-up section is configured as a cantilever, any specific forming configuration may be selected for the pushing-up section, wherein the pushing-up section in the form of a separate component may be attached to an inner wall surface of the puller accommodating section, for example. However, as described above, the number of components can be reduced by cutting out the pushing-up sections 123 from the bottom 121b of the puller accommodating section 121 by forming the slits 121b-1 therein.

Furthermore, as an example for the pushing-up section, the above-described embodiment shows that a pair of pushing-up sections 123 is provided as cantilevers which extend in parallel to each other in a staggered manner. However, even when a pair of pushing-up sections is provided as cantilevers, their arrangement is not limited to configurations in which the pushing-up sections extend in parallel to each other in a staggered manner. For example, the pair of pushing-up sections as cantilevers may be arranged so as to extend in parallel to each other, with their free ends being aligned with each other and with their fixed ends being aligned with each other. However, as described above, abnormal noises can be further suppressed by the pair of pushing-up sections 123 as cantilevers extending in parallel in a staggered manner as described above.

Moreover, as an example for the arrangement of the puller side protrusion, the puller side protrusion and pushing-up section, the above-described embodiment shows that the accommodating side protrusions 122 and the puller side protrusions 112 which are locked to each other are positioned between the pair of pushing-up sections 123. However, the arrangement of the accommodating side protrusion, puller side protrusion and pushing-up section is not limited thereto, but the accommodating side protrusion and puller side protrusion may be arranged far from a position between the pair of pushing-up sections, for example. However, as described above, abnormal noises can be further suppressed by arranging the accommodating side protrusions 122 and the puller side protrusions 112 between the pair of pushing-up sections 123.

REFERENCE SIGNS LIST

1 Electrical junction box
1a Box main body section
10 Fuse puller accommodating structure
110 Fuse puller 111 Puller main body
111a Gripping elements
111a-1 Gripping claws
111b Forward end
112 Puller side protrusions
120 Accommodating member
121 Puller accommodating section
121a Inner wall surfaces
121b Bottom
121b-1 Slits
122 Accommodating side protrusions
123 Pushing-up sections
123a Fixed ends
123b Free ends
D11 Inserting direction
D12 Arranging direction
D13 Bending direction
D14 Pushing-up direction

What is claimed is:

1. A fuse puller accommodating structure comprising:
a puller main body configured to hold a fuse when detaching or attaching the fuse;
a bottomed-tubular puller accommodating section configured for inserting and accommodating the puller main body in a non-used state therein;
an accommodating side protrusion provided within the puller accommodating section;
a puller side protrusion provided on the puller main body, wherein the puller side protrusion is configured to cross over the accommodating side protrusion in an inserting direction of the puller main body and be then locked to the accommodating side protrusion when inserting the puller main body into the puller accommodating section; and
a pushing-up section provided at a bottom of the puller accommodating section, wherein the pushing-up section is configured to bias a forward end of the puller main body accommodated in the puller accommodating section in a pushing-up direction in order to push the puller side protrusion against the accommodating side protrusion, wherein the forward end is oriented forward with respect to the inserting direction, and wherein the pushing-up direction is opposite to the inserting direction.

2. The fuse puller accommodating structure according to claim 1,
wherein the puller main body comprises a pair of opposed gripping elements configured to clamp and hold the fuse,
wherein the puller accommodating section comprises a pair of opposed inner wall surfaces configured to face outer lateral surfaces of the pair of opposed gripping elements when the puller accommodating section accommodates the puller main body,
wherein the accommodating side protrusion is provided on each of the pair of opposed inner wall surfaces of the puller accommodating section, and
wherein the puller side protrusion is provided on an outer lateral surface of each of the pair of opposed gripping elements, wherein when the puller main body is inserted into the puller accommodating section, the puller side protrusions are configured to cross over the accommodating side protrusions to be locked to the accommodating side protrusion while bending the pair of opposed gripping elements in a bending direction, wherein in the bending direction, the pair of opposed gripping elements approaches each other.

3. The fuse puller accommodating structure according to claim 1,
wherein the pushing-up section is a cantilever which has one end as a fixed end and another end as a free end,
wherein when accommodating the puller main body, the pushing-up section is configured to be bent, with the free end being pushed down in the inserting direction by the forward end of the puller main body, so that the pushing-up section biases the forward end in the pushing-up direction with the free end via a restoring force.

4. The fuse puller accommodating structure according to claim 2,
wherein the pushing-up section is a cantilever which has one end as a fixed end and another end as a free end,
wherein when accommodating the puller main body, the pushing-up section is configured to be bent, with the free end being pushed down in the inserting direction by the forward end of the puller main body, so that the pushing-up section biases the forward end in the pushing-up direction with the free end via a restoring force.

5. The fuse puller accommodating structure according to claim 3,
wherein the cantilever as the pushing-up section is a portion which is cut out from the bottom of the puller accommodating section by forming a C-shaped slit therein.

6. The fuse puller accommodating structure according to claim 4,
wherein the cantilever as the pushing-up section is a portion which is cut out from the bottom of the puller accommodating section by forming a C-shaped slit therein.

7. The fuse puller accommodating structure according to claim 3,
wherein a pair of cantilevers as the pushing-up section is provided so as to extend in parallel to each other in a staggered manner, in which a fixed end of one of the cantilevers is positioned closer to a free end of the other of the cantilevers.

8. The fuse puller accommodating structure according to claim 4,
wherein a pair of cantilevers as the pushing-up section is provided so as to extend in parallel to each other in a staggered manner, in which a fixed end of one of the cantilevers is positioned closer to a free end of the other of the cantilevers.

9. The fuse puller accommodating structure according to claim 5,
wherein a pair of cantilevers as the pushing-up section is provided so as to extend in parallel to each other in a staggered manner, in which a fixed end of one of the cantilevers is positioned closer to a free end of the other of the cantilevers.

10. The fuse puller accommodating structure according to claim 6,
wherein a pair of cantilevers as the pushing-up section is provided so as to extend in parallel to each other in a staggered manner, in which a fixed end of one of the cantilevers is positioned closer to a free end of the other of the cantilevers.

11. The fuse puller accommodating structure according to claim 1,
wherein a pair of pushing-up sections is arranged in an arranging direction in the bottom of the puller accommodating section, wherein the arranging direction extends along the bottom and intersects the inserting direction, wherein the accommodating side protrusion and the puller side protrusion are configured to be positioned between the pair of pushing-up sections with respect to the arranging direction in a state where the accommodating side protrusion and puller side protrusion are locked to each other.

12. The fuse puller accommodating structure according to claim 2,
wherein a pair of pushing-up sections is arranged in an arranging direction in the bottom of the puller accommodating section, wherein the arranging direction extends along the bottom and intersects the inserting direction,
wherein the accommodating side protrusion and the puller side protrusion are configured to be positioned between the pair of pushing-up sections with respect to the arranging direction in a state where the accommodating side protrusion and puller side protrusion are locked to each other.

13. The fuse puller accommodating structure according to claim 3,
wherein a pair of pushing-up sections is arranged in an arranging direction in the bottom of the puller accommodating section, wherein the arranging direction extends along the bottom and intersects the inserting direction,
wherein the accommodating side protrusion and the puller side protrusion are configured to be positioned between the pair of pushing-up sections with respect to the arranging direction in a state where the accommodating side protrusion and puller side protrusion are locked to each other.

14. The fuse puller accommodating structure according to claim 5,
wherein a pair of pushing-up sections is arranged in an arranging direction in the bottom of the puller accommodating section, wherein the arranging direction extends along the bottom and intersects the inserting direction,
wherein the accommodating side protrusion and the puller side protrusion are configured to be positioned between the pair of pushing-up sections with respect to the arranging direction in a state where the accommodating side protrusion and puller side protrusion are locked to each other.

15. The fuse puller accommodating structure according to claim 7,
wherein a pair of pushing-up sections is arranged in an arranging direction in the bottom of the puller accommodating section, wherein the arranging direction extends along the bottom and intersects the inserting direction,
wherein the accommodating side protrusion and the puller side protrusion are configured to be positioned between the pair of pushing-up sections with respect to the arranging direction in a state where the accommodating side protrusion and puller side protrusion are locked to each other.

16. An electrical junction box comprising:
the fuse puller accommodating structure according to claim 1; and
a box main body section configured to attach the fuse thereto and detach the fuse therefrom by means of the puller main body.

* * * * *